July 3, 1923.
I. BOYSEN
METHOD OF TAKING PICTURES
Filed March 15, 1921
1,460,744
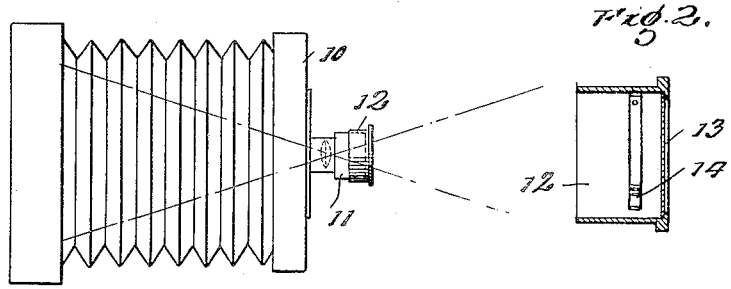
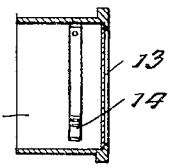
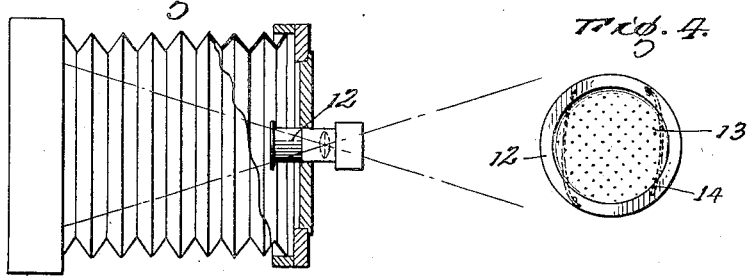
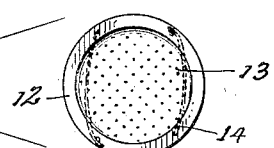
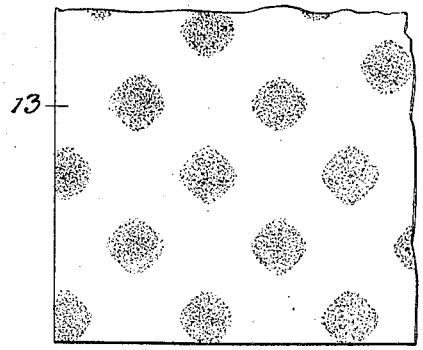
Iwer Boysen
INVENTOR
BY ATTORNEY

Patented July 3, 1923.

1,460,744

UNITED STATES PATENT OFFICE.

IWER BOYSEN, OF NEW YORK, N. Y.

METHOD OF TAKING PICTURES.

Application filed March 15, 1921. Serial No. 452,519.

*To all whom it may concern:*

Be it known that I, IWER BOYSEN, a citizen of the United States, residing at New York city, in the county of New York and State of New York, have invented certain new and useful Improvements in Methods of Taking Pictures, of which the following is a specification.

This invention has relation to photography and has for an object to provide a method of taking photographs whereby the necessity for retouching the resulting negative is largely eliminated and whereby a much softer negative, in the case of portraits can be obtained without the use of soft focus lenses, or other means.

Another object of the invention is to improve the method of making photographs as defined in my Patent No. 1,343,613, dated June 15, 1921.

In the accompanying drawings in which similar and corresponding parts are designated by the same characters of reference throughout the several views in which they appear, Figure 1 is an elevation of the entire camera and the lens mount.

Figure 2 is a section taken through the transparent screen holder or casing.

Figure 3 is a similar view shown by Figure 1 with parts broken away.

Figure 4 is a front view of the casing or holder shown in Figure 2.

Figure 5 is a fragmentary plan view on an enlarged scale of the transparent screen 13.

With reference to the drawing, 10 indicates a camera and 11 the lens mount. In the method shown in Figure 1 I place over the lens mount a cap consisting of a cylindrical casing 12, open at both ends and having a screen 13 applied at one end. This screen is made in the manner described in my patent above referred to and is preferably of celluloid having a large number of very small, semi-opaque black dots all over its surface, uniformly arranged in diagonal rows and having rounded corners and shaded edges substantially as shown in Figure 6. In order that the cap may be held upon lens mounts which are smaller and do not fit the cap snugly I may provide a pair of spring fingers 14 upon the inside of the cap, one at each side, each finger being anchored at one end only. These fingers will grip the lens mount and prevent the cap from falling off.

The effect of this arrangement when taking a picture is to diffuse the light, since the reflected light from the object or sitter must traverse the screen before entering the lens or before impinging upon the sensitive surface within the camera. The resultant negative will present a softened appearance in which the black dots of the screen will not be defined at all. Thus, the necessity for extensive retouching is eliminated. Also this device will avoid the use of expensive soft focus lenses since the results obtained are practically the same.

A different method of using the device is shown in Figure 3 wherein the cap 12 is shown inside the camera and held just back of the lens. The reflected light from the object, etc., first traverses the lens and then the screen before impinging upon the sensitive medium. The results obtained however are practically the same as with the first method.

After the negative, made in accordance with the above described method is finished, it may be printed in accordance with the method disclosed in the patent above mentioned, that is, by interposing between the negative and sensitive paper a screen made in the manner described in said patent, thus imparting an even greater softening and modeled effect. Also, if desired the screen 13 which is mounted in the cap 12 may be tinted very slightly with some color to increase the exposure necessary, thus securing greater detail. For this purpose pink or blue may be used, although other colors can be employed with good results without destroying color values in the negative.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. The herein described method of taking photographs which consists in interposing between the object and the lens, a transparent screen having upon its surface a field of very small semi-opaque dots.

2. The herein described method of taking photographs which consists in interposing between the object and the lens, a transparent screen having upon its surface a field of dots.

In testimony whereof I affix my signature.

IWER BOYSEN.